Nov. 5, 1940. J. G. GATES ET AL 2,220,760
MACHINE FOR UNIFORMLY SPACING PARALLEL CORDS
Filed May 22, 1939 2 Sheets-Sheet 2
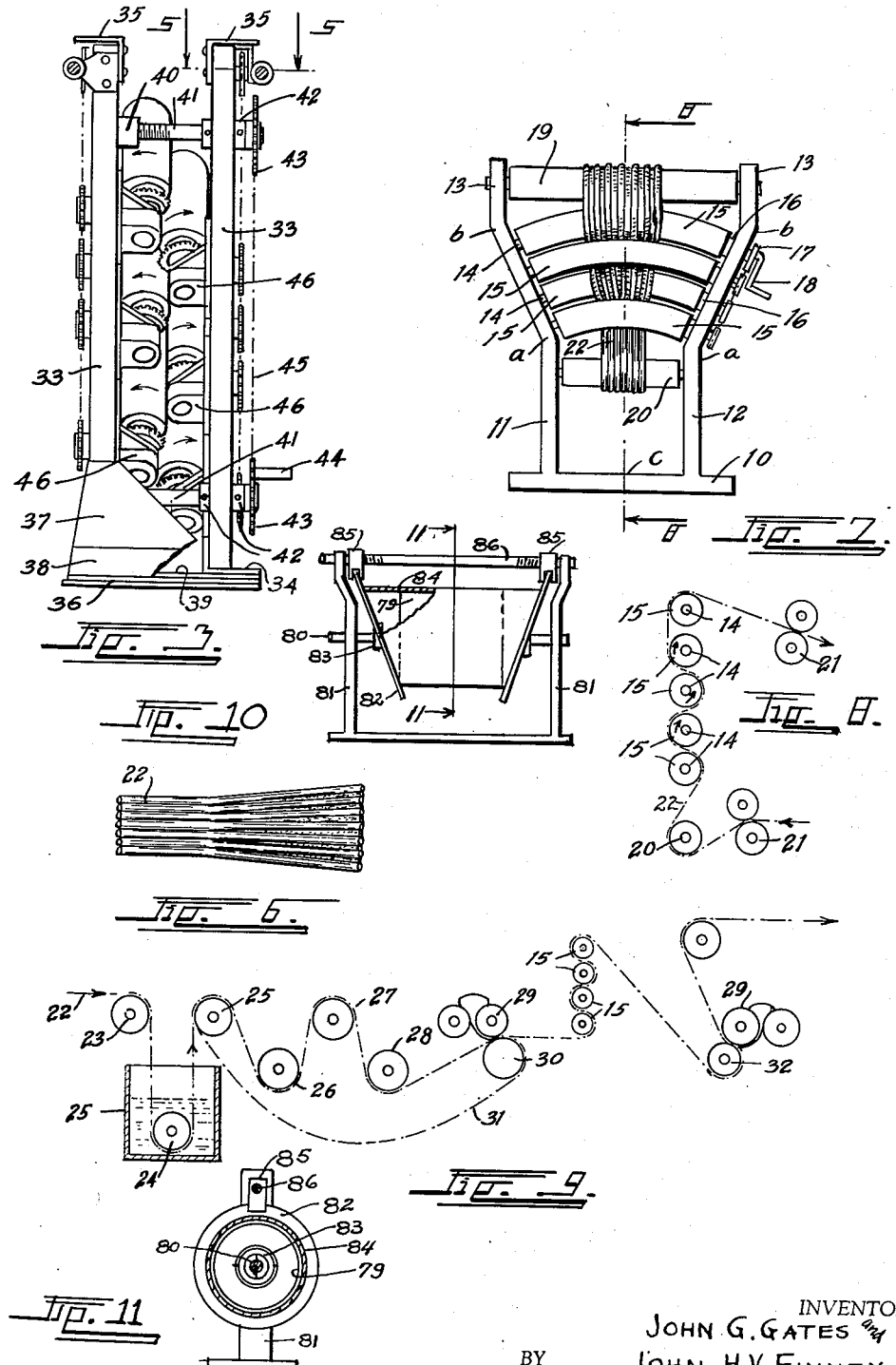
INVENTORS
JOHN G. GATES
JOHN H. V. FINNEY
BY Martin E. Anderson
ATTORNEY.

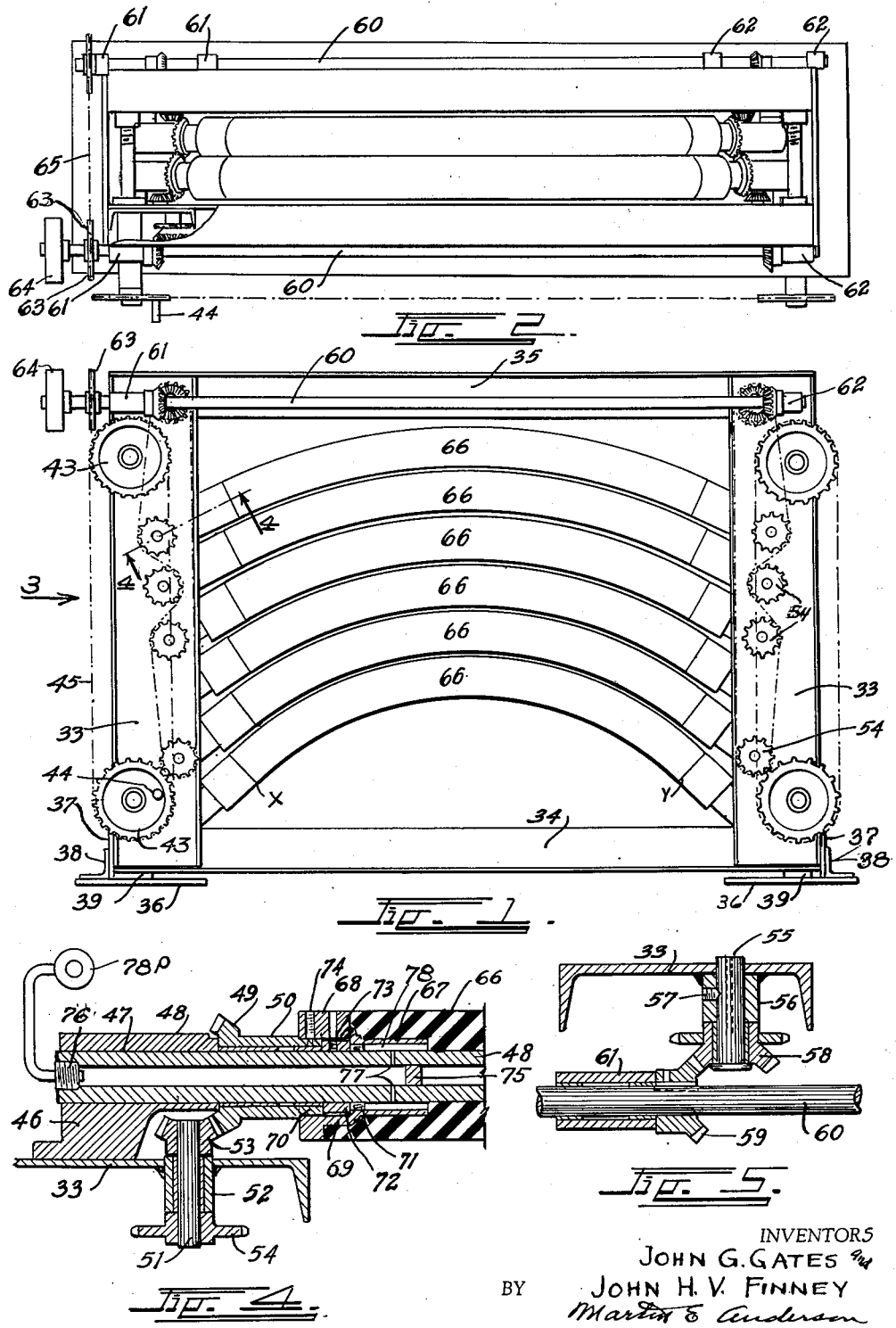

Patented Nov. 5, 1940

2,220,760

UNITED STATES PATENT OFFICE 2,220,760

MACHINE FOR UNIFORMLY SPACING PARALLEL CORDS

John G. Gates and John H. V. Finney, Denver, Colo., assignors to The Gates Rubber Company, Denver, Colo., a corporation of Colorado Application May 22, 1939, Serial No. 274,896

5 Claims. (Cl. 26—63)

This invention relates to improvements in machines for making rubberized cord fabric for use in the building of automobile tires and has reference more particularly to a machine for uniformly spacing the cords in the said rubberized cord fabric.

In the construction of automobile tires, it is almost universal practice to employ cord fabric for reenforcing the body of the tire, instead of woven fabric, as was previously the custom.

It has been found that in order to get the best results, the cords of which the fabric is principally composed must be spaced a short distance from each other so that the cords will be separated by a layer of rubber that will permit them to move relative to each other without the production of undue friction and heat.

In the construction of such fabric, the cords are arranged in a layer in close proximity to each other, after which they are impregnated with latex and are then laid on top of a canvas belt, after which they are coated on one side with a friction coat of rubber. The cord layer may then be coated on the other side with a similar friction coat.

It is the object of this invention to produce a machine by which the cords in the finished fabric will be uniformly spaced throughout the entire length of the fabric.

In order to obtain the proper spacing in accordance with this invention, the cords are arranged in contact with each other at the time they are subjected to the latex impregnation and are then positioned on top of an endless canvas belt while still in contact. A friction coat of rubber is then applied to one side, after which the fabric is passed through the machine which forms the subject of this invention, whose function it is to stretch the cord fabric transversely and uniformly, thereby spacing the cords the desired distance, after which a friction coat of rubber is applied to the opposite side whereby the cords will be firmly held in properly spaced relation.

Having thus briefly described the objects of the invention and the steps of the method by which the objects are attained, the machine by means of which the cords are spaced will now be described, and for this purpose reference will be had to the accompanying drawings in which the invention has been illustrated in its present preferred form, and in which:

Figure 1 is a front elevation of the machine;

Figure 2 is a top plan view thereof;

Figure 3 is an end elevation looking in the direction of arrow 3, in Figure 1;

Figure 4 is a section taken on line 4—4, Figure 1;

Figure 5 is a section taken on line 5—5, Figure 3;

Figure 6 is a fragmentary view showing the position of the cords before and after they have been subjected to the operation of the spacing machine;

Figure 7 is a front elevation showing in a more or less diagrammatic manner a simple hand operated machine by means of which the invention can be more clearly explained;

Figure 8 is a section taken on line 8—8, Figure 7;

Figure 9 is a diagrammatic view showing in a general way the machines employed in the production of the cord fabric;

Figure 10 is a side elevation of a modified form of the invention; and

Figure 11 is a section taken on line 11—11, Figure 10.

In order to explain the operation of the machine, reference will now be had to Figures 6 to 9, which have been incorporated for the purpose of facilitating the description.

Reference numeral 10 designates the base from which two frame members 11 and 12 project upwardly. That portion of the frame members between points $a$ and $b$ has been shown as upwardly flaring and the upper ends terminate in vertical sections 13. Secured to the vertical flaring sides are a plurality of arcuate axles 14, which are arranged in the same plane and are all curved about the common center C. The axles are covered with tubular rubber rollers 15 which are provided at one of their ends with a tubular sleeve 16, to the outer end of which a spur gear 17 is attached. A crank 18 is attached to one of the sleeves 16, and by turning this crank the rollers will be rotated in opposite directions in the manner common in ordinary clothes wringers. In Figure 8 the direction of rotation of the rollers has been designated by arrows. Pivoted to the vertical extensions 13 is a straight roller 19, which does not take an active part in the spreading operation and a similar roller 20 is pivoted to the vertical frame members 11 and 12. Other rollers such as 21 are a part of other machines or merely for support. In Figures 7 and 8 a layer of cords 22 has been shown as passing underneath the roller 20 and thence zigzag between the rollers 15, in the manner indicated in Figure 8. Since the rollers 15 are made of rubber or other flexible and resilient material, and since they rotate on arcuate axes, it is evident that the longitudinal elements of the cylindrical rollers will be alternately stretched and compressed and will be the shortest on the inside of the curve and the longest on the outside of the curve, and therefore when the cords are put into contact with the arcuate rollers at the inside of their curvatures, they will be gradually moved apart as they move upwardly with the rollers to the outside of the curvature and will be uniformly spaced. After the cords have been spaced by one roller, they will be delivered to the inside of the next roller and this will then continue the separation and deliver them to the next roller above where a similar spreading action takes place. The amount of spreading by each roller is not very great, but by combining several rollers, any amount of spreading can be obtained. In usual practice the cords, when in contact, have about twenty-six cords per inch, and after the spreading action is complete, there will be about twenty-two cords per inch. The number of cords per inch will, of course, depend on the diameter of the cord.

In Figure 9, a schematic representation of the complete machine has been shown. The cords have been designated by reference numeral 22 and these pass over a supporting roller 23 and thence around a roller 24 positioned in the bottom of a tank 25 that contains latex. The cords then pass upwardly and over a roller 25 and are then laid upon an endless canvas which has been shown dotted. The canvas and the cords pass around the rollers 26, 27 and 28 during which time the latex is dried and the cords then pass between the rollers 29 and 30 of a machine which applies to one surface a friction coat of rubber. The canvas support has been indicated by reference numeral 31. After the friction coat has been applied to one surface, the cord fabric is then passed through the spreading machine which has been represented by the four rollers marked 15. After the cords have been spread, the fabric is then passed around a roller 32 which is in contact with the roller 29 of another machine that applies a friction coat to the other surface of the fabric and this holds the cords in spaced relation.

Having thus described in a general way the operation of the machine, reference will now be had to Figures 1 to 5, inclusive, in which the machine actually employed for this purpose has been illustrated.

The spreading machine consists of two substantially identical frames, each having two vertical frame members 33 made from channel beams like that illustrated in Figure 5. These beams are connected at their bottoms by angle irons 34 and at their tops by similar angles 35. The frame shown to the left in Figure 3 is attached to a base plate 36 by means of a gusset plate 37 and an angle iron bracket 38. The plate 36 is secured to the floor and the frame attached to this plate is therefore stationary. The other frame, the one to the right in Figure 3, is supported by plate 36 in such a way that it can slide towards and away from the stationary frame and is provided with transverse guide plates 39. Projecting inwardly from the frame at the left in Figure 3 are hubs or projections 40 that have threaded openings for the reception of the bolts 41. These bolts pass through suitable bearings in the vertical frame members 33 on the right-hand frame and are held against longitudinal movement by means of collars 42. Sprocket wheels 43 are secured to the outer ends of bolts 41 and the lower sprocket wheel is provided with a handle 44. These sprocket wheels are interconnected by means of chains 45 so that they rotate in the same direction and at the same speed whereby the two frames can be moved toward or away from each other. The two bolts at each end can be operated independently of each other, or the sprocket chain 45 may encircle all four sprocket wheels so as to get a simultaneous and uniform rotation of all adjusting bolts. The purpose of this adjustment will be hereinafter referred to.

Secured to the inside surfaces of the webs 33 are bearing blocks 46, which are held in place by rivets or other suitable means, and these are provided with openings 47 for the reception of the arcuate tubular shafts 48. These shafts are about a common center between the points marked "X" and "Y", while the outer ends extend tangentially from points "X" and "Y" and are positioned in the openings 47 in the manner shown in Figure 4. Journalled on the straight end portions of the shafts are bevel gears 49 having long tubular hubs 50. Short shafts 51 are mounted for rotation in tubular bearings 52, electro-welded or otherwise secured to the webs of the channel frame members. Attached to the inner ends of shafts 51 are bevel pinions 53 that mesh with the pinions 49 in the manner shown in Figure 4. Non-rotatably secured to the outer ends of the shafts 51 are small sprocket wheels 54. Attached to the upper ends of the vertical frame members 33 are other short shafts 55 that are mounted in the tubular bushings 56 to which they are secured by means of set screws 57. A bevel gear 58 is rotatably secured to the outer end of each shaft 55, and this is in operative engagement with a cooperative bevel gear 59 that is non-rotatably secured to the shaft 60. This shaft is mounted for rotation in bearings 61 and 62 and extends to the left of the machine as shown in Figure 1, where it is provided with a sprocket wheel 63. The shaft extends beyond the sprocket wheel and as a belt pulley 64, or other equivalent means to which power is applied for rotating the shaft. There is one shaft 60 on each side of the machine and these have been shown as interconnected by means of a sprocket chain 65, although other means may be provided for this purpose because the frames are movable and a sprocket chain interconnection is therefore not the most practical.

Mounted on each of the arcuate axles 48 are tubular rubber rollers 66. The openings in these rollers are slightly bigger than the diameter of the shaft so as to have a loose rotating fit thereon. In each end of each roller a tubular bushing 67 is inserted and this is preferably vulcanized to the roller. It will be observed that the outer ends of the bushings 67 have enlarged portions 68 of the same diameter as the roller and these end portions are provided with openings 69 of the proper size to receive the reduced end 70 of the tubular hubs 50. After the rubber rollers are put in place on the shafts, sealing rings 71 are positioned within the openings in the tubular bushings and these serve as seals for preventing liquid from flowing out in a manner to be hereinafter described. A removable collar 72 is then put in place over the shaft and secured in position by means of a set screw 73. The reduced end of the hub 50 is now introduced into the opening in part 68 and clamped in position by means of a set screw 74. It will now be apparent that when shaft 51 is rotated, it will rotate the roller 66 because this is nonrotatably attached to the tubular hub 50 by means of bushings 67 and set screw 74. A similar driving connection is provided for each end of each of the rollers and these are driven in synchronism by the means illustrated so as to prevent the rollers from being subjected to twisting torque.

Referring now more particularly to Figure 4, it will be observed that shaft 48 is tubular and that a plug 75 is positioned in the opening some distance from the end thereof. The outer end has a threaded section 76 to which a nipple can be attached. Between the end of the shaft and the plug 75, a plurality of openings 77 extend through the wall and into the space 78. A pump 78P delivers water under pressure to the interior of the hollow shaft and forces it through openings 77 into the space between the shaft and the inside of the roller, whereby the latter is spread apart and separated from the surface of the shaft by the water thus introduced. This water serves as a lubricant and besides that it increases the diameter of the opening in the roller so as to prevent any considerable amount of friction. It is possible to circulate the water through the shaft, in which case any heat generated due to friction, will be dissipated.

Mention has previously been made to the fact that the frames are adjustable toward and away from each other by the action of bolts 41. The purpose of this is to adjust the amount of spreading done by each roller because the amount of spreading depends on the angular extent of the contact between the cords and the surface of the roller that is increasing in length and if the cords contact the roller through an angle of 180 degrees, the spreading will be a maximum and will decrease in proportion to the decrease in the arc of contact. By positioning the rollers as shown in Figure 8, the spreading action is the maximum and by moving the sets of rollers apart, the spreading action per roller can be adjusted to get the desired total spreading effect.

In the machine illustrated in Figures 1 to 9, a plurality of comparatively small rollers are employed, each of which effects a certain part of the spreading or spacing action. It is, however, evident that these rollers can be increased in size to any extent desired and it is therefore possible to get almost any desired spreading action with one roller, as it is merely necessary to increase the diameter of this roller, or its curvature, so as to get the effect desired.

There are other means of effecting the same result and in Figures 10 and 11 a slightly modified form of construction has been illustrated. In this construction a large cylinder 79 is mounted on a shaft 80 that in turn is mounted for rotation in suitable bearings in vertical frame members 81. Spaced from the ends of the cylinder 79 are circular plates 82 that are of greater diameter than the cylinder. These plates are connected to shaft 80 by means of a universal joint comprising the gimbal ring 83 so that they may move in any direction relative to the shaft. A tubular elastic member 84 which may be regarded as composed of a plurality of elastic elements is connected with the plates 82 and rests on the outer surface of cylinder 79. The edges of the plates are engaged in spaced forks 85 that are threaded to an adjusting shaft 86. This shaft is mounted for rotation in suitable bearings in the ends of frame members 81 and is provided with right and left hand threads so that whenever this shaft is rotated, the forks will move towards and away from each other. When the shaft 80 is rotated, the cylinder 79 and the end disks 82 will also be rotated with the result that the elastic elements 84 will increase in length for one-half of a revolution and will then decrease to the original length and the extent of this change in length can be determined by the position of the forks 85.

It is evident that cord fabric can be transversely stretched or cords spaced from each other by means of an apparatus like that shown in Figures 10 and 11 and when such an apparatus is used, the cylinder can be of any desired size. The cords or cord fabric can be held against the surface of the rotating cylinder by encircling the same through any angular extent from a very short arc to 180 degrees.

It will be observed that in the two forms illustrated the desired action is attained by a rotating cylinder of elastic material which is acted upon by certain mechanisms that increase the length of the longitudinal elements through an arc of substantially 180 degrees and then decrease them to their original length.

In the above description and on the drawings this invention has been described and shown as incorporated in a machine for use in making rubberized cord fabric. It is evident, however, that the machine is not limited to this particular use and that it can be employed in any place where cords are to be separated a predetermined distance whether the resulting product is to be used in the manufacture of tires or for any other purpose.

In describing the operation and the method the statement has been made that the cords are first dipped in latex and this is true when the machine is employed for making cord fabric. The word "latex" however, in the sense in which it is used in this description is intended to be generic and to include any similar substance such, for example, as a rubber cement, whether the same be made from natural or artificial rubber.

It is sometimes necessary to uniformly space a number of parallel cords that are entirely free from cementitious material and it is to be understood that the use of the machine is not limited to cement covered cords and that it can be used for any purpose for which it is suited.

In the drawings and in the specification the machine shown and described is provided with vertical frames but it is evident that the particular position of the machine does not affect its operation and that it will operate equally well if it is horizontal instead of vertical and even if the part that is shown at the top in Figures 1, 2 and 3 are at the bottom and the word "vertical" has therefore been used principally to facilitate the description and make it harmonize with the embodiment shown on the drawings.

In Figures 10 and 11 an embodiment has been shown employing a single extensible cylinder or tubular member 84 and wherever the desired spreading can be obtained by a single tube that is sufficient. However, where a greater amount of spreading is desired than can be conveniently obtained by a single spreading member, a plurality may be assembled in the manner shown in Figure 7.

Referring now to Figure 8, attention is called to the fact that the lower pair of rollers designated by numeral 21 are the feed rollers which supply the cord layer and the upper pair of rollers 21 are the tension rollers which maintain the cord layer under the desired tension. Rollers 15 constitute the cord spreading device as above described.

Having described the invention what is claimed as new is:

1. A machine for uniformly spreading a layer of parallel cords, comprising two frames each having spaced frame members, means for adjustably interconnecting the frames whereby they may be moved towards and away from each other, each frame having a set of arcuate axles attached at their ends thereto, all of the axles being arched in the same direction, the axes of the axles of each set lying in the same plane and spaced equal distances apart, the axles in the two sets being staggered, a flexible tubular roller of resilient material mounted for rotation on each axle, means for rotating all of the rollers in each set in the same direction, the two sets of rollers being interconnected for equal peripherial speed rotation in opposite directions, a liquid between the outside of the axles and the insides of the rollers, and means for maintaining the liquid under pressure during operation, whereby the surfaces of the axles will be separated from the interior surfaces of the rollers by said liquid.

2. A machine for uniformly spreading a layer of parallel cords, comprising two frames each having spaced frame members, means for adjustably interconnecting the frames whereby they may be moved towards and away from each other, each frame having a set of arcuate axles attached at their ends to the frame members, all of the axles being arched in the same direction, the axes of the axles of each set lying in the same plane and spaced equal distances apart, the axles in the two sets being staggered, a flexible tubular roller of resilient material mounted for rotation on each axle, means for simultaneously transmitting motion to both ends of each roller in both sets for rotating them at the same peripherial speed, the rollers of the two sets rotating in opposite directions whereby adjacent surfaces of adjacent rollers will move in the same direction, and whereby every longitudinal element of every roller will be lengthened and shortened once during each revolution, means for circulating a liquid through the spaces between the shafts and the interiors of the rollers during operation, and means for maintaining the liquid under pressure.

3. A fabric expander comprising, in combination, a curved nonrotatable shaft having an axial opening extending thereinto from one end thereof, the inner end of the opening being closed, the wall of the shaft having an opening adjacent the bottom of the axial opening, a rubber tube enclosing the shaft, tubular bearings in the ends of the rubber tube, means for rotating the tube relative to the shaft, and means for forcing liquid under pressure into the opening in the shaft whereby it will pass through the opening in the wall and into the space between the shaft and the inner surface of the tube, the pressure being sufficient to expand the tube whereby it will be spaced from the shaft and rotate freely thereon.

4. In a fabric expander, in combination, a shaft, means for nonrotatably supporting the ends thereof, the shaft having an axial opening extending thereinto from one end thereof, a closure for the inner end of the opening, bevel gears rotatably mounted on the shaft adjacent each end thereof, said gears having an elongated hub, a rubber tube surrounding the shaft, a bushing nonrotatably attached to each end of the tube, said bushings being nonrotatably connected with the bevel gear hub, the wall of the shaft having radial openings adjacent the closure which establishes a connection between the interior of the shaft and the space between the outer surface thereof and the inner surface of the tube, a liquid seal between the openings in the wall and the end of the bushing, and means for forcing liquid under pressure into the interior of the shaft whereby it will flow through the opening in the wall of the shaft and into the space between the outside of the shaft and the inside of the tube the pressure being sufficient to expand the tube and space it from the shaft.

5. A fabric expander apparatus comprising a frame having spaced members, the plurality of spaced curved shafts supported at their ends by said members, a flexible rubber tube surrounding the shafts and positioned on the curved portions of the shafts, bearings secured to the ends of the tube and operatively associated with the shafts, each bearing having a bevel gear nonrotatably secured thereto, a bearing secured to the frame member adjacent each end of each shaft, a stub shaft journaled in the last mentioned bearings, the inner ends of the stub shafts having bevel gears operatively associated with the bevel gears on the bearings, and means for interconnecting the stub shafts for simultaneous and equal rotation, the vertically adjacent stub shafts rotating in opposite directions.

JOHN G. GATES.
JOHN H. V. FINNEY.